United States Patent [19]

Ruhovets

[11] Patent Number: 4,584,874

[45] Date of Patent: Apr. 29, 1986

[54] METHOD FOR DETERMINING POROSITY, CLAY CONTENT AND MODE OF DISTRIBUTION IN GAS AND OIL BEARING SHALY SAND RESERVOIRS

[75] Inventor: Naum Ruhovets, Houston, Tex.

[73] Assignee: Halliburton Company, Duncan, Okla.

[21] Appl. No.: 660,689

[22] Filed: Oct. 15, 1984

[51] Int. Cl.[4] .............................................. E21B 49/00
[52] U.S. Cl. ...................................................... 73/152
[58] Field of Search ........................... 73/152; 364/422

[56] References Cited

U.S. PATENT DOCUMENTS 3,721,960  3/1973  Tinch et al. ........................... 73/152
4,502,121  2/1985  Clavier et al. ..................... 73/152 X Primary Examiner—Jerry W. Myracle
Attorney, Agent, or Firm—W. J. Beard

[57] ABSTRACT

A method for determining formation porosity, volume of clay content, and mode of distribution in gas, oil, and water bearing shaly sand reservoirs provides solutions regardless of whether gas and oil densities are known or unknown, whether or not there is invasion of borehole fluids into the connate fluids, and whether or not there is dispersed clay only or both dispersed and laminated clays are present.

7 Claims, 4 Drawing Figures

METHOD FOR DETERMINING POROSITY, CLAY CONTENT AND MODE OF DISTRIBUTION IN GAS AND OIL BEARING SHALY SAND RESERVOIRS

BACKGROUND OF THE INVENTION

The present invention relates to well logging methods and apparatus, and more particularly to methods for analyzing and determining characteristics of gas, oil, and water bearing shaly sand reservoirs, specifically the porosity, clay content, mode of distribution, and hydrocarbon density of such a formation.

In current well/reservoir logging, the density-neutron log cross-plot technique has proven to be the most reliable tool for porosity and clay content determination in oil and water saturated shaly sands. Comparative departures between these logs have proven to be a good shale indicator because the neutron log is more affected by clay than the density log.

In gas bearing reservoirs, however, the density and neutron log responses are greatly influenced not only by porosity and clay content, but also by such variables as gas density, water saturation and invasion of mud filtrate. Gas and light oil have substantially lower hydrogen concentrations. As a result, if gas or light oil is present, the neutron reading will almost certainly be affected. The apparent porosity measured by the neutron tool will then be too low. On the other hand, bulk density as determined by gamma ray density measurements will be too low, causing the apparent porosity as measured by the density tool to be too high. In gas bearing shale formations, the shale effects are opposite to the gas, so the results can be substantially the same as with a clean sand with a higher potential. This can cause the logging results to be overly optimistic. In such conditions, the conventional cross-plot technique for determining clay content can lead to unacceptable errors. An even greater danger of over-estimating clay content can result from using shale indicators such as GR or SP.

In gas bearing shaly sand reservoirs, therefore, the conventional approach of clay content determination from the density-neutron crossplot technique is not applicable. Even if the volume of clay could be precisely determined from some other method (natural gamma ray, SP, etc.), the determination of effective porosity in gas bearing shaly sand would still present a problem since the hydrogen index and the electron density of the fluid in hydrocarbon bearing reservoirs do not produce similar effects on the two logs, and have to be determined before the effective porosity can be computed. Only in the case when the density of hydrocarbons is known and there is practically no invasion, can the clay content and porosity be easily determined through an iterative process which uses density, neutron and resistivity measurements.

As theoretical considerations have thus shown, there is no simple solution to this problem. Rather, a comprehensive solution appears to be required which incorporates several different approaches depending on available geological and logging information.

SUMMARY OF THE INVENTION

Briefly, the present invention meets the above needs and purposes with an integrated method incorporating several complementary approaches for analyzing and determining characteristics of gas bearing shaly sand reservoirs, including the porosity, clay content, mode of clay distribution, and hydrocarbon density. The particular approach which is selected will depend upon available geological and logging information.

Basic formulae for density and neutron log responses have been used to determine the affect on density and neutron logs of variations in the water saturation, in the density of hydrocarbons, in the depth of invasion, and in clay volume and type of distribution. Hydrogen indices and electron densities of fluids can be calculated from equations proposed by Gaymard and Poupon (R. Gaymard, and A. Poupon, *Response of Neutron and Formation Density Logs in Hydrocarbon Bearing Formations.* The Log Analyst, September-October, 1968). These equations were subsequently modified (A. Poupon, C. Clavier, J. Dumanoir, R. Gaymard, and A. Misk, *Log Analysis of Sand-Shale Sequences—A systematic Approach.* Journal of Petroleum Technology, July, 1970).

Results of some of these computations are presented in FIGS. 2 and 3. The data presented includes computations for water saturations varying from 0 to 100% while the density of the hydrocarbons is held fixed at 0.2 g/cc, and computations for hydrocarbon densities varying from 0.1 to 0.9 g/cc with the water saturation held fixed at 20%. These computations were performed for 3 cases: (1) clean reservoir of 30% porosity, (2) shaly reservoir with 10% dispersed clay, and (3) shaly reservoir with 33% laminated clay. It was assumed that the bulk density of the clay is 2.4 g/cc and the neutron response to clay is 30% porosity.

On the density-neutron crossplot (FIG. 2), points representing density and neutron log responses to reservoirs with differing water saturations form straight lines with the slope equal to 0.85 (if both density and neutron logs are expressed in porosity units). Points for variable hydrocarbon density and constant water saturation form the curved lines. With increasing hydrocarbon density, the slopes of these curved lines increase and, for average hydrocarbon densities 0.3–0.7 g/cc, approach the slopes of the aforementioned straight lines. At high hydrocarbon densities the curves extend to the right of the clean water saturated sand line even if no clay is present. This is due to the fact that the hydrocarbon electron densities and hydrogen indices are not equal and can affect density and neutron log responses in a way similar to that of clay, when hydrocarbon density is high.

Graphs for the shaly reservoirs are separated from those for the clean reservoirs, indicating the presence of clay. Dispersed clay causes significantly wider separation compared to laminated clay, despite the greater volume of laminated clay required to result in equal effective porosities.

Influence of mud filtrate invasion on the density and neutron log responses was studied by the computation of the water saturation within the limits of the radii of investigation of density and dual spaced neutron logs. Since a pad mounted sidewall neutron log has a radius of investigation approximately equal to that of the density log, the effect of invasion for this combination of logs is similar to the effect of the variation in water saturation and thus was not considered. It has been shown (Sherman, H. and Locke, S., *Depth of Investigation of Neutron and Density Sondes for 35-Percent-Porosity Sand,* SPWLA Symposium Transactions, 1975) that a typical radius of investigation of a compensated density log is equal to 5 inches and that of a dual spaced neutron log 10 inches. The average water saturation in flushed zones was computed as $S_{xo}=S_w{}^{0.2}$. (A nomenclature table is provided at the end of this specification.) Then:

$$S_{wn}=(S_{xo}d_i+S_w(10-d_i))/10, \quad d_i \leq 10 \qquad (1)$$

$$S_{wd}=(S_{xo}d_i+S_w(5-d_i))/5, \quad d_i \leq 5 \qquad (2)$$

These water saturations were used to compute density and neutron log responses influenced by invasion. Some results of these computations are shown in FIG. 3. These data were computed with $S_w=20\%$ and $\rho_h=0.2$ g/cc. For comparison, straight lines for variable water saturations from previous examples are also presented. As can be seen, maximum distortions of density and neutron log responses occur when the depth of invasion is equal to the radius of density log investigation, i.e., 5 inches. If invasion is too great (10 inches or more) it merely affects logs in the same way as increased water saturation. The influence of invasion also diminishes in formations with decreased effective porosity, increased water saturation, and/or increased hydrocarbon density.

Accordingly, several interpretation methods have been developed and tested for the following cases:

1. Gas density is known and there is no invasion. Porosity and clay content can then be determined from density, neutron logs, and a resistivity device regardless of type of clay distribution.

2. Gas density is known and there is invasion. Since density and dual spaced neutron logs have different radii of investigation, the depth of invasion has to be determined before interpretation similar to case 1 can be accomplished.

3. Densities of gas and oil are unknown and may vary, but only dispersed clay is present. This is a common case in gas-oil fields. If laminated clay is present, this case also applies if sand beds are thicker than the vertical resolutions of density, neutron, and resistivity measurements. The interpretive method for this case requires density and neutron logs and permits determination of clay content and porosity with a maximum uncertainty of about ±1%, assuming input log values are accurate.

4. Gas and oil of unknown densities are contained in very thin shaly sand beds interbedded with shale laminae, i.e., both dispersed and laminated clays are present. Besides density and neutron logs, a good shale indicator is also needed, such as a natural gamma ray spectroscopy tool, to determine total clay volume, and/or a microresistivity device, such as a dipmeter, to calculate laminated clay content. Thin sand-shale lamination is the most difficult case and requires special attention. A technique is disclosed for recognizing these conditions for proper log interpretation.

In the case of unknown and variable hydrocarbon densities, the best results in determination of the volume of clay and porosity in gas bearing shaly sands can be obtained by treating dispersed and laminated clays separately. As disclosed in the present invention, a relatively accurate determination of the dispersed clay volume can be made from density and neutron logs regardless of hydrocarbon density and water saturation. The invention also makes corrections for invasion, for the presence of laminated clay, and other corrections if necessary.

As suggested above, the volume of thin clay laminae, unresolved by density and neutron logs, can be determined from microresistivity measurements such as the dipmeter. Alternatively, the total volume of clay can be estimated from such advanced shale indicators as natural gamma ray spectroscopy, and then the laminated clay volume can be found by subtracting the volume of dispersed clay from the total volume of clay. If the laminated clay content is erroneously computed as being excessively high, the present invention can detect and correct it.

It is therefore a feature of the present invention to furnish an improved method for analyzing and determining characteristics such as porosity, clay content, mode of clay distribution, and hydrocarbon density in gas, oil, and water bearing shaly sand reservoirs; a method which furnishes such results through a flexible approach which responds to available geological and logging information; and a method which accomplishes these features in an accurate, versatile, reliable, and straightforward manner readily suited for use in the widest possible range of gas, oil, and water bearing shaly sand reservoir analyzes.

Other features and advantages of the invention will be apparent from the following description, the accompanying drawings and the appended claims.

DESCRIPTION OF THE PREFERRED EMBODIMENT

With reference to the drawings, the new and improved method for determining porosity, clay content, and mode of distribution in gas, oil, and water bearing shaly sand reservoirs according to the present invention will now be described.

Figure 1:
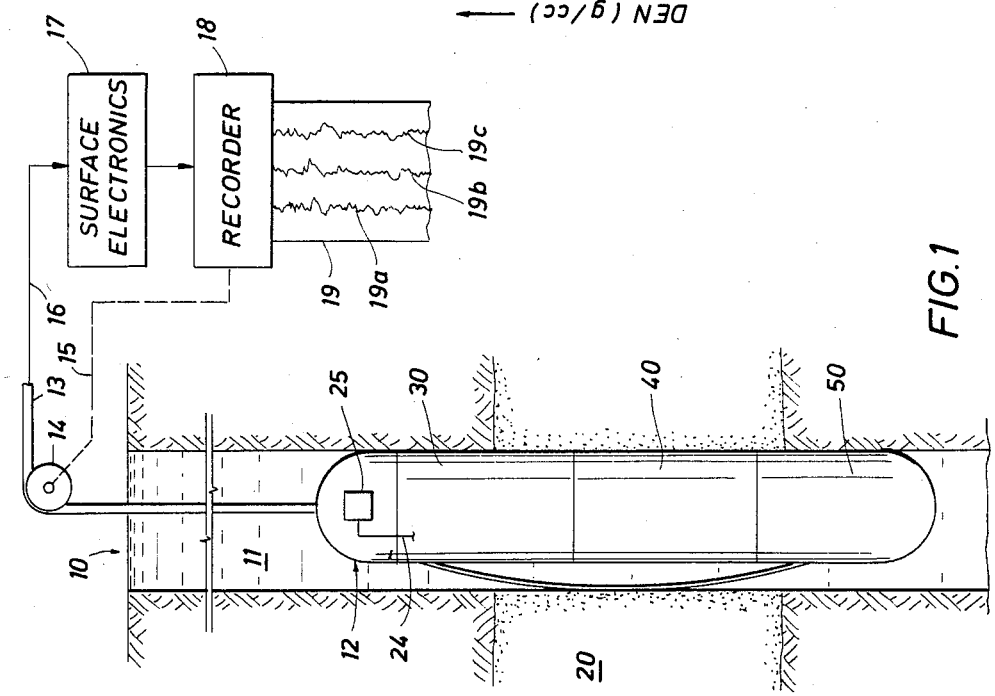
FIG. 1 is a schematic illustration showing a well logging system according to the principles of the present invention.
Figure 3:
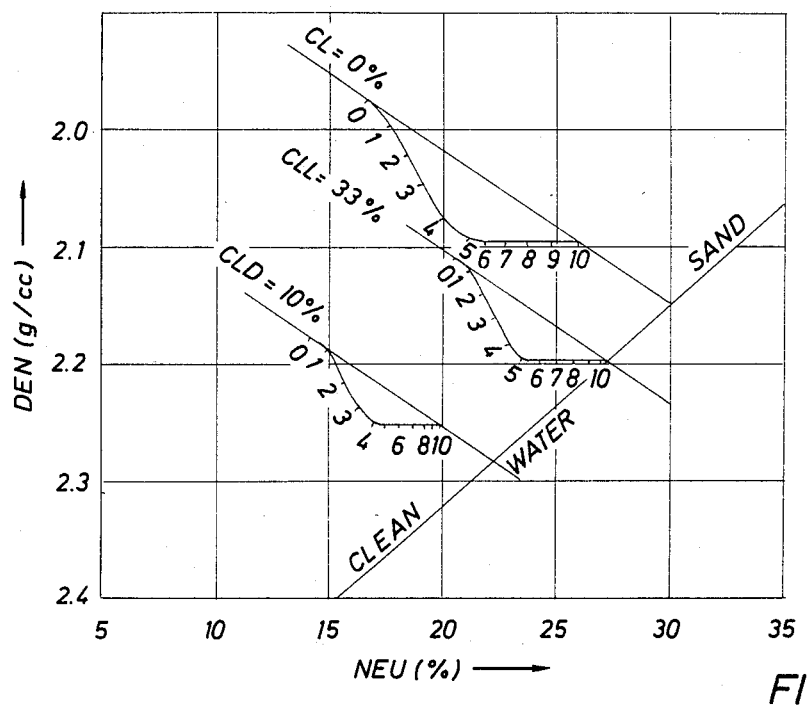
FIG. 3 is a graphical illustration of the effect of the depth of borehole fluid invasion on density and neutron log responses.

Referring to FIG. 1, a well logging system in accordance with the concepts of the present invention is illustrated schematically. A well borehole 10, which is filled with a borehole fluid 11, penetrates the earth formations 20 under investigation. A downhole well logging sonde 12 is suspended in the borehole 10 via a conventional armored logging cable 13, in a manner known in the art, whereby the sonde 12 may be raised and lowered through the borehole as desired. The well logging cable 13 passes over a sheave wheel 14 at the surface. The sheave wheel is electrically or mechanically coupled, as indicated by dotted line 15, to a well logging recorder 18 which may comprise an optical recorder, or magnetic tape, or both, as known in the art. Recorder 18 is shown making a record on a conventional paper chart 19 having curves 19a, 19b, and 19c, for example, recorded thereon. The record of measurements made by the downhole sonde 12 may thus be recorded as a function of the depth in the borehole of the sonde 12.

Data signals generated by sonde 12 travel within the sonde through a sonde communication line 24 to a communication and control link 25, and are then telemetered thereby to the surface via a conductor 16 in the well logging cable 13. At the surface, a surface electronics package 17 detects the telemetered information from the downhole sonde 12 and performs suitable processing, by methods known in the art, to determine the measured quantities. These are then supplied to the recorder 18, where, as indicated, they are recorded as a function of borehole depth.

The downhole sonde 12, as illustrated herein, is comprised of three sections: a density measuring portion 30, a resistivity measuring portion 40, and a formation neutron absorption cross section measuring portion 50. These are illustrated in FIG. 1 as comprising a single tool string, whereby all the measurements are made simultaneously as the sonde 12 is moved through borehole 10 by cable 13. It will be understood, of course, that these measurements may be made independently and at different times with separate tools or tool sections.

It will be appeciated that for the purposes of the present invention the components in portions 30, 40, and 50 may be of types known in the art. All that is required to perform the preferred embodiment of the invention is that reliable density, resistivity, and porosity data be obtained. Therefore, sections 30, 40, and 50 need not be described in particular detail.

Depending upon the geological conditions, available information, and the logging suite, the problem of clay content and porosity determination in gas bearing reservoirs can be either relatively simple or quite complicated, as can be seen from the discussions above. Accordingly, in the preferred embodiment of the invention, different approaches are applied to the various situations. These situations are as follows: (1) the density of the hydrocarbons is known and there is no invasion; (2) the density of the hydrocarbons is known and there is invasion; (3) the density of the hydrocarbons is unknown but basically only dispersed clay is present; and (4) the density of the hydrocarbons is unknown, changes with depth, and any type of clay distribution is possible (the most general and complicated case). Common to the analysis of all these cases is the requirement for density and neutron logs. Requirements for applications of other logs depend on which interpretation technique is being used.

Case 1: Density of hydrocarbons is known and there is no invasion.

In gas fields the density of hydrocarbons is often known or can be estimated in a clean section of the reservoir. Invasion may be negligible in highly porous, moderately shaly reservoirs such as those often found in the Gulf coast area. Kukal reported an absence of invasion in tight gas sands having very low permeability. (Kukal, G. C., *Determination of Fluid Corrected Porosity in Tight Gas Sands and in Formations Exhibiting Shallow Invasion Profiles*. SPE 9856, Proceedings of the 1981 SPE/DOE Symposium on Low Permeability Gas Reservoirs, May, 1981.)

In addition to the density and neutron logs, a resistivity measuring device is also required. First the hydrogen index and electron density of the hydrocarbons are computed from the equations below (Gaymard and Poupon, 1968, infra):

$$HI_h 9 \rho_h (0.15 + 0.2(0.9 - \rho_h)^2) \quad (3)$$

$$\rho_{eh} = \rho_h + HI_h/9 \quad (4)$$

Then a value for water saturation is assumed (usually a small number, e.g., 10% or less).

The hydrogen index and electron density of fluid are computed from:

$$HI_f = HI_h(1 - S_w) + S_w \quad (5)$$

$$\rho_{ef} = \rho_{eh}(1 - S_w) + S_w \rho_w \quad (6)$$

Volume of clay is determined from:

$$V_{cl} = \frac{NEU(\rho_m - \rho_{ef}) - HI_f(\rho_m - DEN)}{N_{cl}(\rho_m - \rho_{ef}) - HI_f(\rho_m - \rho_{cl})} \quad (7)$$

Effective porosity can be determined either from:

$$\phi_e = (NEU - V_{cl}N_{cl})/HI_f \quad (8)$$

or from:

$$\phi_e = (\rho_m - DEN - V_{cl}(\rho_m - \rho_{cl}))/(\rho_m - \rho_{ef}) \quad (9)$$

Then water saturation is computed from the appropriate water saturation equation, as chosen by the analyst. Suitable equations are those which take into account the effect of shale on resistivity measurements (e.g., the Dual Water Model, Simandoux Equation, Waxman & Smits, etc.). The computed water saturation value is then compared with the assumed value. If they are different, the last $S_w$ value is substituted into equations (5) and (6), and computations are repeated until adequate convergence in $S_w$ is achieved.

Case 2: Density of hydrocarbon is known and there is invasion of mud filtrate.

Depth of mud filtrate invasion into a reservoir depends on many factors, such as porosity, permeability, differential pressure, quality of mud (primarily water loss), density, and viscosity of hydrocarbons. Depth of invasion should be determined before any other computations are performed. Multi-spacing resistivity measurements can be used for this purpose. If they are not available, the depth of invasion can be estimated in a clean portion of the reservoir. If the shaliness of gas reservoirs is not too great and the effective porosity does not change drastically, it can be assumed that the depth of invasion into reservoirs will not change significantly as long as the density and viscosity of the hydrocarbons remain constant. Then the depth of invasion can be determined in a clean gas bearing reservoir with known maximum porosity.

For the clean gas bearing reservoir we can write:

$$HI_f = NEU/\phi_{max} \quad (10)$$

Then $HI_h$ is determined from equation (3). Water saturation is determined from the Archie equation: $S_w^2 = aR_w/\phi^m$, and water saturation in invaded zones is found as $S_{xo} = S_w^{0.2}$. Water saturation within the radius of neutron log investigation is found as:

$$S_{wn} = (HI_f - HI_h)/(1 - HI_h) \quad (11)$$

The depth of invasion is determined from:

$$d_i = 10(S_{wn} - S_w)/(S_{xo} - S_w) \quad (12)$$

The depth of invasion is then applied to shaly reservoirs to determine $S_{wn}$ and $S_{wd}$ by using equations (1) and (2), and to determine $HI_f$ and $\rho_{ef}$ from equations (5) and (6). All further steps are the same as in Case 1.

When the volume of clay and the effective porosity are computed as described in Cases 1 and 2, then, when desired, types of clay distribution can be determined from published equations (e.g., Ruhovets, N. and Fertl, W. H., *Digital Shaly Sand Analysis Based on Waxman-Smits Model and Log-Derived Clay Typing.* The Log Analyst, XXIII, No. 3, 1982).

Case 3: Density of hydrocarbons is unknown and may vary, but only dispersed clay is present.

This case is applied to gas-oil fields where presence of laminated clay is very limited or clay and sand laminae are thicker than the vertical resolution of the logging tools (including filters).

Figure 2:
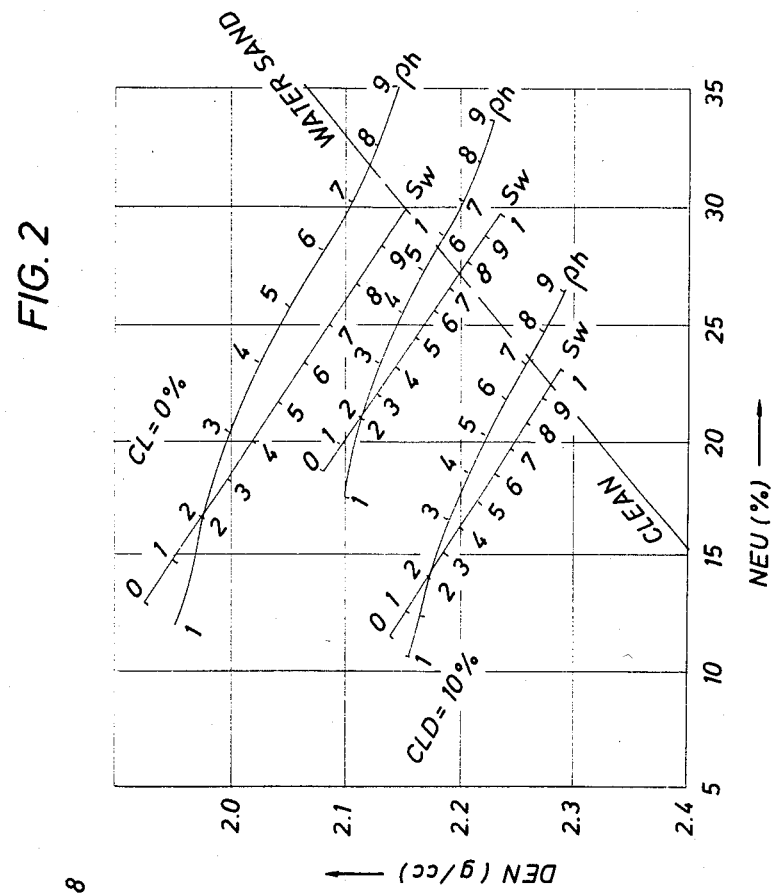
FIG. 2 is a graphical density-neutron crossplot illustrating the effect thereon of differing water saturations (straight lines), and of varying hydrocarbon densities (curved lines)

It can be seen from FIG. 2 that the presence of dispersed clay in a shaly reservoir is clearly indicated by the density-neutron response points falling considerably below the points for clean gas bearing reservoirs. The greater the clay content, the greater the distance between the points for clean and shaly reservoirs.

If one assumes that the hydrogen index of fluid affects a neutron log in the same way that the electronic density affects a density log, and no clay is present in the reservoir, then the apparent fluid density can be found from the basic density and neutron log response equations as follows:

$$\rho_{af} = \rho_m NEU/(\rho_m - DEN + NEU) \quad (13)$$

Then the apparent porosity can be determined from either the density or the neutron log:

$$\phi_1 = NEU/\rho_{af} = (\rho_m - DEN)/(\rho_m - \rho_{af}) \quad (14)$$

This apparent porosity is usually 1–3% higher than the true effective porosity. The magnitude of this divergence depends on water saturation, hydrocarbon density, clay bulk density, and the neutron response to clay. Variations in hydrocarbon density cause changes of less than 1% in apparent porosity, while variations in water saturation can cause changes of up to 2%.

Thus, the volume of dispersed clay and the effective porosity can be found with the accuracy of about ±1%, providing the maximum porosity in the clean reservoir is known or can be determined in the clean water bearing interval, and assuming all log values accurately reflect the hydrogen index and electron density of the formation.

After numerous computations on theoretical examples with various reservoir and clay parameters, the following empirical equation has been developed for the calculation of the dispersed clay content:

$$V_{cld} = (\phi_{max} - 0.94\phi_a)(1.155 - 0.4(2.1 - \rho_{cl} + N_{cl})) \quad (15)$$

Then the effective porosity will be:

$$\phi_e = \phi_{max} - V_{cld} \quad (16)$$

If $\phi_{max}$ determined in a clean water-bearing interval is actually less in other water or hydrocarbon bearing reservoirs, then computed dispersed clay volumes in such intervals would be too high. As follows from Gaymard and Poupon equations (5) and (6), when there is no invasion the difference between $HI_f$ and $\rho_{ef}$ cannot be less than $(HI_h - \rho_{eh})(1 - S_2)$, and it cannot be less than $-0.2(1 - S_2)$ when the influence of invasion on the density-neutron log separation is maximum ($d_i = 5$ inches). When the chosen $\phi_{max}$ is too great, the difference between $HI_f$ and $\rho_{ef}$ will be less than this. Then $\phi_{max}$ is reduced by iteration until this difference exceeds the above values.

In this case it is assumed that there is no laminated clay in the reservoir. However, some amount of laminated clay is usually present. Therefore, in practice, when the density of hydrocarbons is not known, it is usually Case 4 that is applicable. Accordingly, other appropriate corrections applied to dispersed clay computation are considered in Case 4.

Case 4: Density of hydrocarbons is unknown and both dispersed and laminated clays are present.

The presence of thin clay laminae is indicated by relatively high apparent porosity, sharp variations in microresistivity curves, and the volume of clay derived from various shale indicators being higher than the volume of dispersed clay calculated from equation (15).

A change in the laminated clay content in a gas reservoir does not necessarily lead to a change in the calculated apparent porosity (equation (14)). Thus the volume of laminated clay in a gas bearing reservoir can not be determined from density and neutron logs by the method similar to the one developed for the dispersed clay volume determination. Yet the density and neutron logs can still be useful as secondary methods to check volume of laminated clay when it is determined by some other method. Thus, this case requires some good shale indicators which can accurately determine either the total volume of clay or only the volume of the laminated clay.

Natural gamma ray spectroscopy tools can be extremely useful to determine the total volume of clay. All combinations of the recorded components (U,Th,K) are used for this purpose. The combination chosen depends on prevailing clay type, presence of radioactive non-clay material (often having high uranium concentration, i.e. radioactive silt and organic material, or high potassium concentrations, i.e. feldspars, mica) and other geological conditions. If the total volume of clay is determined, the laminated clay volume can be found as the difference between the total volume and the dispersed clay volume calculated by equation (15).

A direct determination of the laminated clay content can be accomplished by analyzing a microresistivity or dipmeter log response. In hydrocarbon bearing reservoirs, clay laminae are usually indicated by resistivities lower than for sand beds, and thus can be easily detected. Quantitatively it can be done in the following manner.

Let the average vertical resolution of density and neutron devices be M. Then a curve drawn through the inflection points of the microresistivity curve can be used to estimate the total thickness (N) of clay laminae within interval M. That is, the sum of the lengths of those sections of the inflection curve which pass above the convex down sections of the microresistivity curve is the total thickness of clay laminae. Then the laminated clay content is:

$$V_{cll} = N/M \quad (17)$$

The presence of laminated clay, invasions, and high water saturation can lead to overestimation of the dispersed clay content when using equation (15). Correction for laminated clay is performed by the following empirical formula:

$$V_{cld} = V_{cld'} - (0.4(\rho_{cl} - N_{cl} - 2.1) + 1.2(\phi_{max} - 0.2))V_{cll} \quad (18)$$

A correction for invasion should be made when the depth of invasion is close to the radius of density log investigation. Thus if the depth of invasion can be determined (for example, from a multi-spacing resistivity measurement), the computed volume of dispersed clay can be corrected by the following equation:

$$V_{cld} = V_{cld'} - 0.0017 d_i (10 - d_i)(1 - 0.8\rho_{af}^3)\phi_a/\phi_{max} \quad (19)$$

For water bearing reservoirs, equation (15) will also yield too high a value for the volume of dispersed clay when the volume of laminated clay is low. The following equation is used to correct the computed clay volume when water saturation is greater than 40% and laminated clay content is less than 50%:

$$V_{cld} = V_{cld'} - 0.3 S_w^2 (0.15 - V_{cld'})(0.5 - V_{cll}) \quad (20)$$

This approach gives the best results for average hydrocarbon densities (from about 0.2 to 0.7 g/cc). When densities of hydrocarbon are less or greater than this range, further corrections can be applied. For this purpose, density and neutron log responses, corrected for total volume of clay, are used to determine the corrected apparent fluid density ($\rho_{afc}$) from the following equation:

$$\rho_{afc} = \frac{\rho_m(NEU - V_{cl}N_{cl})}{\rho_m - DEN - V_{cl}(\rho_m - \rho_{cl} + N_{cl}) + NEU} \quad (21)$$

If the computed $\rho_{afc}$ is greater than 0.95 g/cc, the dispersed clay volume is corrected as follows:

$$V_{cld} = V_{cld'} - 3(0.15 - V_{cld'})(\rho_{afc} - 0.95)(0.5 - V_{cll}) \quad (22)$$

If the computed $\rho_{afc}$ is less than 0.45 g/cc, the dispersed clay volume is corrected as follows:

$$V_{cld} = V_{cld'} - (0.15 - V_{cld'})(0.45 - \rho_{afc})(0.5 - V_{cll}) \quad (23)$$

As can be seen from the above equations, corrections for laminated clay and hydrocarbon densities are applied when the volume of dispersed clay is low (less than 15%).

To check the computed volume of clay against the density and neutron log responses, the effective porosity is first estimated as:

$$\phi_e = \phi_{max}(1 - V_{cll}) - V_{cld} \quad (24)$$

The hydrogen index and electron density of the reservoir fluid are computed from the following equations:

$$HI_f = (NEU - V_{cl}N_{cl})/\phi_e \quad (25)$$

$$\rho_{ef} = (DEN - \rho_m(1 - \phi_e - V_{cl}) - V_{cl}\rho_{cl})/\phi_e \quad (26)$$

As follows from equations (3) and (4), the average difference between $HI_f$ and $\rho_{ef}$ can not be greater than about $0.2(1 - S_w)$. If $V_{cl}$ was considerably overestimated, the difference between $HI_f$ and $\rho_{ef}$ will be greater than that. In this case, $V_{cll}$ is reduced by small increments until the above expression is satisfied. Finally, effective porosity is computed from equation (8) or equation (9).

The following table gives several examples of the volume of dispersed clay and effective porosity computations for various reservoir conditions. An assumption was made that the laminated clay content and depth of invasion were accurately determined.

TABLE 1

| Input | | | | | | | | Output | | |
|---|---|---|---|---|---|---|---|---|---|---|
| $\rho_{cl}$ g/cc | $N_{cl}$ % | $\rho_h$ g/cc | $S_w$ % | $d_i$ inch | $V_{cll}$ % | $V_{cld}$ % | $\phi_e$ % | $\phi_a$ % | $V_{cld}$ % | $\phi_e$ % |
| 2.2 | 40 | 0.1 | 10 | 0 | 0 | 5 | 25 | 27.6 | 5.1 | 24.9 |
| 2.2 | 40 | 0.2 | 50 | 0 | 0 | 10 | 20 | 24.0 | 9.3 | 20.7 |
| 2.2 | 40 | 0.07 | 20 | 5 | 0 | 7 | 23 | 23.4 | 7.6 | 22.4 |
| 2.2 | 40 | 0.15 | 30 | 0 | 30 | 3 | 18 | 29.4 | 3.1 | 17.9 |
| 2.2 | 40 | 0.30 | 20 | 3 | 50 | 6 | 9 | 27.1 | 5.1 | 9.9 |
| 2.2 | 40 | 0.20 | 40 | 7 | 20 | 9 | 15 | 24.1 | 8.7 | 15.3 |
| 2.4 | 30 | 0.1 | 30 | 0 | 0 | 20 | 10 | 14.5 | 18.9 | 11.1 |
| 2.4 | 30 | 0.7 | 20 | 0 | 0 | 5 | 25 | 27.4 | 4.9 | 25.1 |
| 2.4 | 30 | 0.5 | 70 | 2 | 10 | 8 | 19 | 23.0 | 7.9 | 19.1 |
| 2.4 | 30 | 0.2 | 20 | 5 | 60 | 2 | 10 | 22.5 | 2.7 | 9.3 |
| 2.4 | 30 | — | 100 | 0 | 40 | 4 | 14 | 23.1 | 4.4 | 13.6 |
| 2.4 | 30 | 0.1 | 10 | 6 | 50 | 2 | 13 | 23.2 | 2.7 | 12.3 |
| 2.55 | 20 | 0.1 | 20 | 0 | 0 | 10 | 20 | 21.9 | 10.0 | 20.0 |
| 2.55 | 20 | 0.7 | 60 | 0 | 0 | 7 | 23 | 24.4 | 7.0 | 23.0 |
| 2.55 | 20 | 0.7 | 20 | 5 | 0 | 5 | 25 | 26.0 | 5.1 | 24.9 |
| 2.55 | 20 | 0.2 | 30 | 1 | 50 | 8 | 7 | 13.8 | 6.8 | 8.2 |

DETERMINATION OF HYDROCARBON DENSITY

After determination of water saturation from a deep resisitivity log, and determination of the hydrogen index and electron density of fluid in zones of investigation of neutron and density logs, the density of the hydrocarbon can be estimated as follows. Let us first assume that water saturations as seen by density and neutron logs is equal to $S_w$. Then we can write:

$$HI_h = (HI_f - S_{wn})/(1 - S_{wn}) \quad (27)$$

$$\rho_{eh} = (\rho_{ef} - S_{wd}\rho_w)/(1 - S_{wd}) \quad (28)$$

Rearranging equations proposed by Gaymard and Poupon (Gaymard and Poupon, 1968, infra) we can obtain:

| | | |
|---|---|---|
| $\rho_{h,NEU} = HI_h/2.2$, | for $HI_h < 0.55$ | (29) |
| $\rho_{h,NEU} = HI_h - 0.3$, | for $HI_h \geq 0.55$ | (30) |
| $\rho_{h,DEN} = \rho_{eh}/1.24$, | for $\rho_{eh} < 0.31$ | (31) |
| $\rho_{h,DEN} = (\rho_{eh} - 0.03)/1.11$, | for $\rho_{eh} \geq 0.31$ | (32) |

If there is an invasion of mud filtrate into the formation, the hydrocarbon density ($\rho_{h,DEN}$) computed from the density log will be higher than the hydrocarbon density ($\rho_{h,NEU}$) computed from a dual spaced neutron log. In this case, the depth of assumed mud filtrate invasion is incremented by a fraction of an inch, then new values of $S_{wn}$ and $S_{wd}$ are computed from equations (1) and (2), and the whole process is repeated until $\rho_{h,DEN} = \rho_{h,NEU}$.

FIELD CASE EXAMPLE

Figure 4:
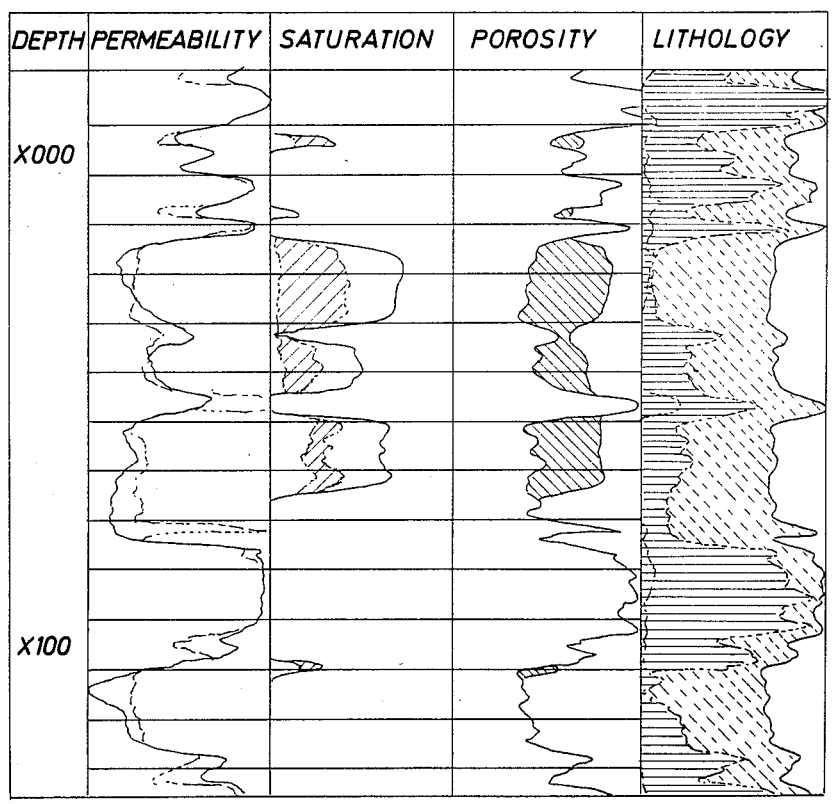
FIG. 4 is a computerized log interpretation showing application of the Case 4 approach to analysis of a well having shaly reservoirs with gas, oil, and water, and both dispersed and laminated clays.

Computerized interpretation of the logs based on the discussed approach (Case 4) is presented in FIG. 4. The subject well has shaly reservoirs with gas, oil, and water, and both dispersed and/or laminated clays are present. The dispersed clay content was computed as described above. The volume of laminated clay was obtained as the difference between the total volume of clay (determined from SP and GR logs) and the dispersed clay, and corrected by the method disclosed herein.

The average effective porosity is higher in the upper gas reservoir than in the two lower hydrocarbon bearing intervals. It is interesting to mention that the apparent porosity (not presented in FIG. 4) computed from equation (13) is higher in lower intervals. Together with the high total volume of shale obtained from SP and GR logs, this indicates the presence of a considerable amount of laminated clay in these intervals, as computed and presented in FIG. 4.

Thus, due to the combined interpretation of the density and neutron logs and the shale indicator, it is now possible to provide an appropriate formation evaluation in these complicated geological conditions.

As may be seen, therefore, the present invention has numerous advantages. It provides a means to determine effective porosity, clay volume, mode of clay distribution, and hydrocarbon density for any type of reservoir saturation (gas, oil, water) when the appropriate logs are available. In the most complicated case, when both dispersed clay and thin clay laminae are present, in addition to density and neutron logs, a reliable shale indicator, such as a natural gamma ray spectroscopy tool and/or a microresistivity device, needs to be included in the logging suite. Further, the method according to the invention accomplishes these features in an accurate, versatile, reliable, and straightforward manner readily suited to use in the widest possible range of reservoir analyzes, with particularly great utility in analyzing gas bearing shaly and reservoirs.

While the methods herein described constitute preferred embodiments of this invention, it is to be understood that the invention is not limited to these precise methods, and that changes may be made therein without departing from the scope of the invention.

NOMENCLATURE $DE_N$—density log
$d_i$—depth of invasion
$HI_f$—hydrogen index of fluid
$HI_h$—Hydrogen index of hydrocarbons
$N_{cl}$—neutron log response to clay
NEU—neutron log
$S_w$—water saturation in virgin formation
$S_{wd}$—water saturation in zone of density log investigation
$S_{wn}$—water saturation in zone of neutron log investigation
$S_{xo}$—water saturation in flushed zone
$V_{cl}$—clay volume
$V_{cld}$—dispersed clay volume
$V_{cll}$—laminated clay volume
$\rho_{af}$—apparent density of fluid
$\rho_{afc}$—corrected apparent fluid density
$\rho_{cl}$—clay bulk density
$\rho_{ef}$—electronic density of fluid
$\rho_{eh}$—electronic density of hydrocarbons
$\rho_h$—density of hydrocarbons
$\rho_m$—matrix density
$\rho_w$—density of water
$\phi_a$—apparent porosity
$\phi_e$—effective porosity
$\phi_{max}$—maximum porosity in clean sand
$R_w$—resistivity of water in virgin formation

What is claimed is:

1. A method for determining formation porosity and volume of clay content in fluid bearing shaly sand reservoirs, regardless of whether the density of the fluid is known, comprising:
(a) determining which one of the following conditions obtain and proceeding to the method step indicated therewith:
 (i) density of hydrocarbons is known and there is no invasion of mud filtrate: step (b),
 (ii) density of hydrocarbons is known and there is invasion of mud filtrate: step (e),
 (iii) density of hydrocarbons is unknown and may vary, and clays which are present are dispersed clays only: step (c),
 (iv) density of hydrocarbons is unknown and may vary, and both dispersed and laminated clays are probably present: step (t),
(b) determining the hydrogen index and electron density of the hydrocarbons,
(c) selecting an arbitrary value for water saturation,
(d) proceeding to step (g),
(e) determining the depth of invasion,
(f) determining a staring value for water saturation,
(g) determining water saturation in the density and neutron zones of investigation;
(h) determining the hydrogen index and electron density of the reservoir fluid using the water saturation values,
(i) determining the volume of clay using the hydrogen index and electron density determined in the preceding step,
(j) determining effective porosity using the clay volume determined in the preceding step,
(k) computing water saturation using the porosity determined in the preceding step, the value which is computed becoming the latest computed water saturation value,
(l) comparing the latest computed water saturation value with the later of the starting and previously computed values, and, until the latest computed value substantially agress with the value with which it is compared, returning to step (g) and using the latest computed water saturation value therein,
(m) then utilizing the last values determined in steps (h) and (i) as the values for the volume of clay and the effective porosity, and
(n) proceeding to step (z),
(o) determining the apparent fluid density,
(p) determining the apparent porosity using the apparent fluid density determined in the preceding step,
(q) calculating the dispersed clay content using the apparent porosity determined in the preceding step,
(r) determining the effective porosity using the dispersed clay content calculated in the preceding step, and
(s) proceeding to step (z),
(t) determining the laminated and dispersed clay volumes,
(u) correcting the determined dispersed clay volume to compensate, where appropriate, for the presence of invasion, laminated clay, high water saturation, and very low and very high hydrocarbon density,
(v) as a function of the laminated and dispersed clay volumes, selecting an initial value of effective porosity,
(w) determining the hydrogen index and electron density of the reservoir fluid using the effective porosity value determined in the preceding step, (x) when the difference between the hydrogen index and the electron density determined in the preceding step is greater than a predetermined amount, reducing the value for the laminated clay volume and returning to step (u) until this condition is satisfied, (y) computing the effective porosity using at least one of the values determined in step (w), and (z) outputting the porosity and clay content values.

2. The method of claim 1 further comprising determining the density of the hydrocarbon in the formation reservoir.

3. The method of claim 2, further comprising, where there is invasion of mud filtrate, incrementing the assumed values of water saturation in zones of density and neutron log investigation until the values for the density of the hydrocarbon determined by the density and by the neutron logs are in agreement.

4. The method of claim 1 wherein the laminated clay volume determined in step (t) is determined by microresistivity measurements.

5. The method of claim 1 wherein the laminated clay volume determined in step (t) is determined by:
(a) determining the total clay volume, and
(b) substracting from the total clay volume the volume of dispersed clay.

6. The method of claim 5 further comprising, when the volume of laminated clay is less than substantially 50% in reservoirs having water saturation greater than substantially 40%, correcting the computed clay volume.

7. A method for determining formation porosity and volume of clay content in fluid bearing shaly sand reservoirs wherein the clay may be dispersed or laminated or both forms of clay where the density of the hydrocarbons is unknown and may vary comprising the steps of:

(t) determining first values for the laminated and dispersed clay volumes, (u) correcting the determined dispersed clay volume to compensate, where appropriate, for the presence of invasion, laminated clay, high water saturation, and very low and very high hydrocarbon density, (v) as a function of the laminated and dispersed clay volumes, selecting an initial value of effective porosity, (w) determining the hydrogen index and electron density of the reservoir fluid using the effective porosity value determined in the preceding step, (x) when the difference between the hydrogen index and the electron density determined in the preceding step is greater than a predetermined amount, reducing the value for the laminated clay volume and returning to step (u) until this condition is satisfied, (Y) computing the effective porosity using at least one of the values determined in step (w), and (z) outputting the porosity and clay content values.

* * * * *